United States Patent
Laakaniemi et al.

[15] 3,654,944
[45] Apr. 11, 1972

[54] FLUID MIXING CONTROL APPARATUS

[72] Inventors: Richard N. Laakaniemi, Milwaukee; Otto R. Munch, West Allis; Paul H. Sorenson, New Berlin, all of Wis.

[73] Assignee: Johnson Service Company, Milwaukee, Wis.

[22] Filed: Oct. 29, 1969

[21] Appl. No.: 872,098

[52] U.S. Cl.............................................137/81.5, 62/186
[51] Int. Cl......................F15c 1/14, F15c 1/16, F15c 1/20
[58] Field of Search...................................137/81.5; 62/186

[56] References Cited

UNITED STATES PATENTS

| 3,417,770 | 12/1968 | Denison | 137/81.5 |
| 3,468,325 | 9/1969 | Bowles | 137/81.5 |
| 3,477,699 | 11/1969 | Drayer | 137/81.5 |
| 3,171,421 | 3/1965 | Joesting | 137/81.5 |
| 3,388,862 | 6/1968 | Gabrielson | 137/81.5 X |

Primary Examiner—William R. Cline
Attorney—Andrus, Sceales, Starke and Sawall

[57] ABSTRACT

The present disclosure includes a conditioning air induction unit for conditioning and circulating air in a room. A fluidic amplifier establishes a primary air flow in accordance with room temperature to control the aspiration of the secondary air flow. The fluidic amplifier is an impact modulator, a beam deflector, an inductance device or a vortex device. In all but the latter, the primary flow is vectored into two streams, one directed into a passageway including a coil and the second through a direct air passageway. The primary air streams may be continuously controlled by a mechanical or fluid signal input to control the relative air flow through the two passageways.

15 Claims, 11 Drawing Figures

PATENTED APR 11 1972 3,654,944

INVENTOR.
Richard N. Laakaniemi
BY Otto R. Munch
Paul H. Sorenson

Attorneys

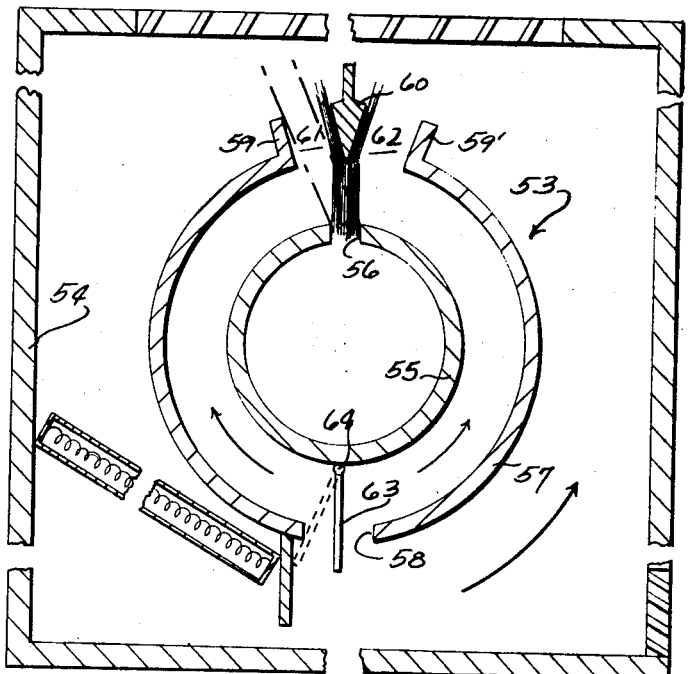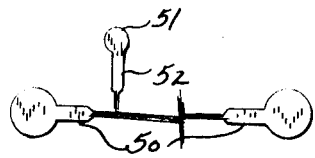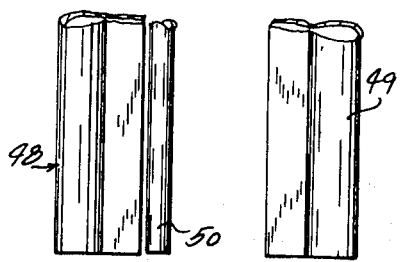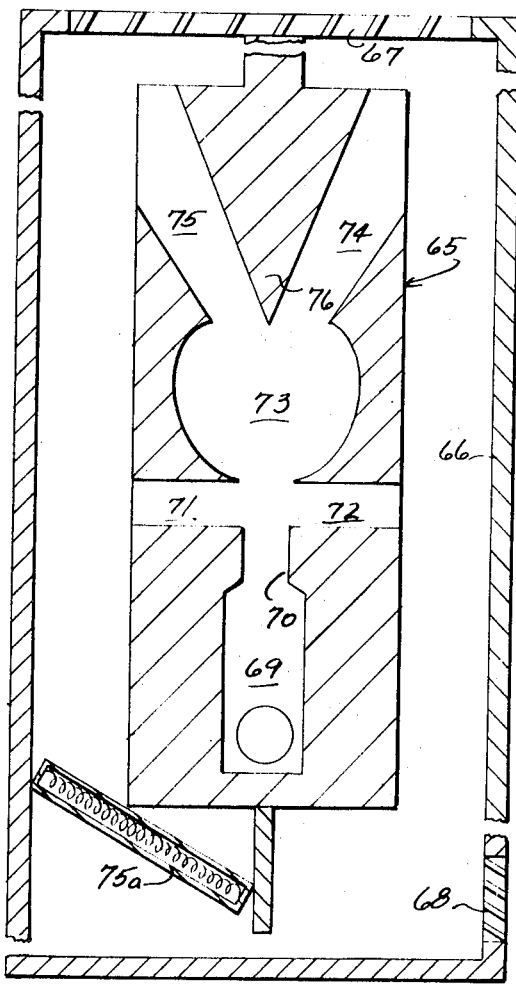
INVENTORS
Richard N. Laakaniemi
BY Otto R. Munch
Paul H. Sorenson
Attorneys

FLUID MIXING CONTROL APPARATUS

BACKGROUND OF INVENTION

This invention relates to a fluidic control apparatus for fluid mixing and particularly to a controlled air mixing for environmental condition control and the like.

A highly desirable method and apparatus for controlling temperature and the like in a room or building structure includes a conditioning air induction unit. In such a system, a primary or driving air flow is created from outdoor air by a suitable fan and conditioning system. Generally, the outdoor air is supplied at a fixed temperature and due point, to one or more such induction units proper, at a constant flow to each unit. The primary flow is directed through the induction unit to aspirate room air, as a secondary source through the induction unit. Generally, the secondary flow will be substantially greater than the primary flow and may be of the order of four to six times the primary flow rate. The system can operate with the primary air flow directly providing a reduction in the secondary air temperature to provide a total reduced temperature air flow, with the rate of flow of the primary air and thereby the secondary air rate of flow also controlled in accordance with the room temperature. Alternatively, the induction unit can be provided with a pair of passageways, one of which includes a conditioning, that is, heating or cooling, coil or other similar unit. The air flow through the induction unit is divided between the two passageways. A damper means is provided to control the relative air flow through the direct passageway and the conditioning coil passageway to adjust the effective conditioning of the air passing thereover. Although such systems have been widely employed and have produced highly satisfactory environmental control units, relatively large damper units are required with resulting relatively large and expensive positioning drive systems. The response of the system, although improved over other systems, is relatively slow. Further, the use of a damper introduces an air side pressure drop through the induction unit. This requires increasing the capacity or size of the unit for any given set of requirements. The above general restrictions on induction units further limit the minimum size and configuration of any given unit for a particular application and may present problems where space limitation is important, as well as from the standpoint of aesthetic consideration.

SUMMARY OF INVENTION

The present invention is particularly directed to such a conditioning fluid induction unit and, in accordance with this invention, a fluidic amplifier means establishes and directly controls the primary flow in accordance with a condition sensing signal. The fluidic amplifier includes a main or power stream input means which is connected to the primary fluid supply. The output of the fluidic amplifier means is coupled to the secondary fluid supply to establish aspiration and, thereby controlled secondary flow. The control means is connected to signal the fluidic amplifier means to vary the primary flow characteristic and, thereby vary the secondary flow characteristic.

Although in the broadest aspect, the system can be applied directly to an all air unit with the magnitude of primary air flow adjusted to control the secondary air flow, the fluidic amplifier is preferably, and in accordance with a particularly unique aspect of the present invention, connected to a primary air source whose pressure is relatively constant at any given unit but which may vary from unit to unit; with the primary flow divided or vectored to establish a pair of primary flow streams for selectively controlling the flow through a conditioning passageway and through a non-conditioning passageway within the the induction unit. The directions of the pair of primary air flow streams with respect to such passageways may be continuously controlled in a selective manner by a suitable signal input. For optimum results, the fluidic amplifier means may be of any proportional type which delivers an approximately constant total flow rate and includes means for effective vectoring of the air; for example, impacting stream devices provide an unusually satisfactory control, although induction amplifiers, beam deflection amplifiers, and the like can be readily employed. The amplifier means must, of course, provide sufficient primary flow rates and distributions to adequately aspirate the secondary air in substantially greater amount; for example, four to six times the primary flow rate for the usual environmental control.

The impacting stream amplifier in one novel construction employs a pair of generally opposed nozzles, which may be diametrically opposed or angularly opposed in the direction of flow. The nozzles are interconnected to the primary air source through a suitable controller which divides the primary air flow in accordance with a sensed condition. The impacting streams, thereby provide an impact position relative to the two passageways for controlling the primary air flow between the two passageways. This in turn results in a corresponding control of the secondary air flow through the two passageways. With the angularly related impacting concept, the secondary air aspiration may occur before impacting, whereas in the directly opposed impacting stream concept aspiration will generally occur following the impacting. The amplifier may be of a two or three dimensional construction and located above or below the conditioning means in the one passageway. The angular stream flow amplifier may advantageously be located below the conditioning means in order to increase the primary air to secondary air interaction surface. If the fluidic amplifier is to be placed above the coil, the directly opposed impacting stream would tend to produce somewhat improved control, as the primary flow will be proportioned before aspiration is established. This in turn will result in an improved proportionate aspiration of the secondary flow. In the angular unit the aspiration is generally near the supply jets, and the proportioning of secondary flow changes very little, with the primary air being vectored.

The impacting stream concept is particularly desirable because it permits minimizing the size of the amplifier and, thereby minimizes interference with the secondary air flow. The inductance amplifier and the beam deflection amplifiers may be employed, but generally require a greater size and will tend to provide greater interference with the secondary air flow. In such units, the angle of the vectored air is essentially held constant with the flow rate proportioned therebetween to vary the control. They would, therefore, be particularly adapted to the induction unit mounting the fluidic amplifier above the conditioning means.

The present invention provides an environmental air or other fluid mixing control having the several advantages of fluidic devices, including rapid response, long reliable life, versatility in application, and relative low cost. The large moving dampers and the associated drives may be replaced with molded fixed partitions and relatively inexpensive fluidic devices. With proper selection of components and construction, the air pressure drop is minimized, thereby minimizing terminal unit size.

The invention possesses higher frequency response and lower hysteresis than the damper controlled units. Therefore it possesses faster transient control response and less steady state offset.

As a fluidic device merely requires control of the signal air flow in contrast to the total air flow as in the damper system, control system power requirements will be reduced.

In accordance with another aspect of the present invention, the fluidic amplifier means may be formed with a plurality of distributed bias control means to superimpose a controlled temperature variation pattern along the length of the unit. Such a construction might be desirable in order to compensate for windows, doors and other devices which tend to cause a variation in the temperature throughout the enclosed area or room.

The output flow versus the input signal characteristic of induction units is very repeatable and consistent when including the fluidic amplifying concept of the present invention and, consequently, a single temperature controller can be connected to readily drive two or more units in parallel, thus providing an improved master-slave-type operation.

BRIEF DESCRIPTION OF DRAWINGS

The drawings furnished herewith illustrate the best mode presently contemplated by the inventor for carrying out his invention and clearly disclose the above advantages and features, as well as others which will be readily understood from the following description.

In the drawings:

FIG. 7 is a fragmentary diagrammatic view showing a possible modification to the structure shown in FIG. 1 and/or FIG. 5;

FIG. 8 is a fragmentary top elevational view of the structure shown in FIG. 7;

FIG. 9 is a diagrammatic vertical section through a conditioning air induction unit employing an inductance amplifier to control the secondary air flow;

FIG. 10 is a view similar to FIG. 9 employing a beam deflection amplifier; and

FIG. 11 is a coilless, single passageway conditioning air induction unit employing a vortex amplifier in accordance with the broad aspects of the present invention.

DESCRIPTION OF ILLUSTRATED EMBODIMENTS OF THE INVENTION

Figure 1:
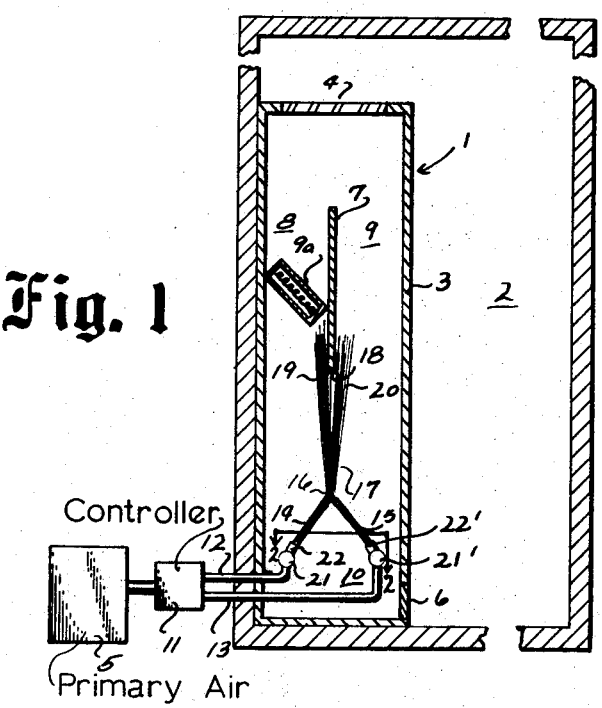
FIG. 1 is a diagrammatic vertical section through a conditioning air induction unit constructed in accordance with the present invention.
Figure 2:
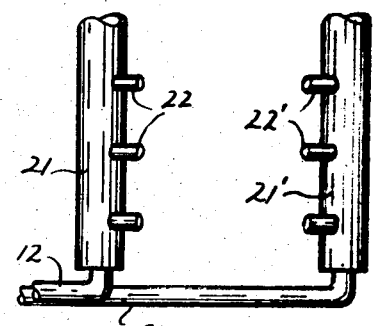
FIG. 2 is a fragmentary view taken generally on line 2—2 of FIG. 1.

Referring to the drawings, and in particular to FIGS. 1 and 2, the present invention is illustrated with a conditioning air induction unit 1 mounted within a room enclosure 2 for conditioning of the room air. Generally, the induction unit 1 includes an outer housing 3 having a generally rectangular cross section and extending along the wall for a predetermined length. The housing 3 includes an upper or top air discharge opening 4. A primary air supply 5 is connected to draw outside air into the unit 1. A secondary air inlet 6 is provided adjacent the base of the housing 3 within the room 2 for purposes of drawing room air into and upwardly through the induction unit 1. A vertical partition or wall 7 is secured in the central portion of the housing 3 and divides the central portion of the housing into a pair of passageways or ducts 8 and 9. In the illustrated embodiment of the invention, the passageway 8 is provided with a conditioning coil unit 9A extending across and angularly upwardly from the partition 7 to the housing 3 adjacent the room wall. The air passing upwardly through the duct 8 is conditioned, whereas the air passing upwardly through the duct 9 is not conditioned, other than as the primary air temperature differs from the secondary air temperature. In the illustrated embodiment of the invention of FIG. 1, a fluidic amplifier 10 is mounted below the partition wall and immediately above the secondary air inlet 6. The fluidic amplifier 10 is connected to a controller 11 via a pair of input lines 12 and 13. Controller 11 has its input interconnected to the primary air supply 5. The primary air is divided by the controller 11 and supplied via the lines 12 and 13 to the fluidic amplifier to establish a pair of primary air jets or streams 14 and 15. In FIG. 1, the fluidic amplifier 10 establishes the streams 14 and 15 in angularly opposed relationship directed upwardly toward the top of the housing 4 with an impacting point 16 generally aligned with the partition 7, and particularly establishing a combined flow jet or stream 17 directed toward the lower end of partition 7. The relative strength of the streams 14 and 15 determines the lateral portion of the stream 17 which engages the lower end 18 of the partition 7, and thereby determines the relative division of the flow into a conditioning duct portion 19 and a direct or bypass duct air portion 20. In the illustrated embodiment, the strength of the stream 14 is slightly greater than the strength of the stream 15. Consequently, the combined flow is angularly related toward the outer bypass duct 9, and more particularly directed to generally centrally engage the end 18 centrally of the stream 17. This then divides the air into the two flow paths 19 and 20, as illustrated. If the strength of the stream 14 were to be further increased as a result of the action of the controller 11, it would tend to deflect the stream further to the right in FIG. 1, thereby resulting in a shifting of the position of stream 17 at the edge of the partition 18 to the right. This would increase the bypass duct air portion 20 and decrease the conditioning duct air portion 19. Conversely, increasing of the stream 15 relative to the strength of the stream 14 results in an opposite or shifting of the stream 17 to the left in FIG. 1 to increase the conditioning air duct flow stream 19 and reducing the bypass duct stream 20.

In the angular related stream unit, shown in FIGS. 1 and 2, the high velocity primary air flow streams 14 and 15 will aspirate the secondary air through the inlet 6. Further, the directing of the streams 14 and 15 in the direction of the total air flow will generally increase the total aspiration. Thus, the illustrated construction is particularly adapted to the illustrated system employing the amplifier 10 below the coil 9a.

In the illustrated embodiment of the invention, the fluidic amplifier 10 includes a longitudinally extended conduit or pipe 21 extending the length of housing 3 and connected at one end to the passageway or line 12. A plurality of angularly related nozzles 22 are secured throughout the length of the conduit 21 to establish a plurality of individual primary air jets or streams 14 throughout the length of the induction unit. A similar conduit 21' and nozzles 22' are provided in aligned laterally spaced relation and connected to the line 13 for establishing a plurality of similar streams 15.

All sides of the streams 14 and 15 have their surfaces interacting with the secondary air supply. This results in a substantial interacting surface with the resulting increased aspiration.

The controller 11 may be any suitable device adapted to control the air division in accordance with the room temperature or any other sensed condition. The controller 11 may, for example, include a mechanical damper control, or a condition responsive fluidic amplifier. As the controller 11 only controls the relatively small volume of the total air, a relatively low power and readily constructed and driven damper unit could be employed. The primary air may also be directly divided or applied to the primary flow lines 12 and 13 from the source 5 with the impacting of the streams controlled by a primary air stream modified by temperature, etc.; for example, as shown in FIGS. 3 and 4, which illustrate the possible modification employing the direct and constant air supply.

Figure 3:
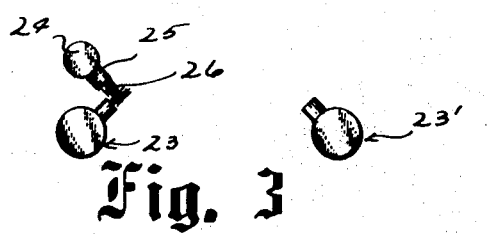
FIG. 3 is a fragmentary illustration showing a modification to the structure of FIGS. 1 and 2.
Figure 4:
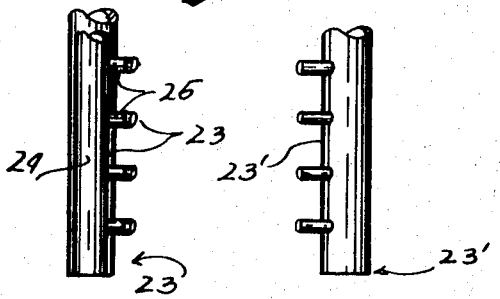
FIG. 4 is a view similar to FIG. 2 of the modification shown in FIG. 3.

In FIGS. 3 and 4, primary vectoring conduit units 23 and 23' generally corresponding to the units 21 and 21' are mounted in similar laterally spaced relation. A constant predetermined vectored primary air is supplied to the conduit units units and 23' to establish similar primary air flow streams 14 and 15. A transverse deflecting control conduit unit 24 is shown mounted above and in alignment with the conduit unit 23. The deflection conduit unit 24 includes a plurality of nozzles 25 aligned with the respective nozzles of the conduit units 23 for establishing deflection control streams 26 directed toward and engaging the primary air flow stream 14 from the unit 23. The stream 26 controls the direction of the related primary air flow stream 14 from the nozzle of conduit unit 23 with respect to the primary stream 15 to adjust the impact point, and thereby the combined flow 17.

In comparing the embodiments shown, the summing impact modulator may advantageously be employed in connection with a mechanical signal, such as a moving damper or the like. In contrast, if a fluidic signal is employed, the transverse modulating concept of FIGS. 3 and 4 would appear to be simpler and preferably employed. This is particularly true with the amplifiers located above the partition and conditioning unit, as the unit is now referenced to the constant local atmospheric pressure existing in the room.

Figure 6:
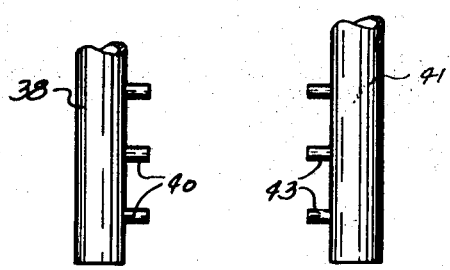
FIG. 6 is a fragmentary view taken generally along lines 6—6 of FIG. 5.
Figure 5:
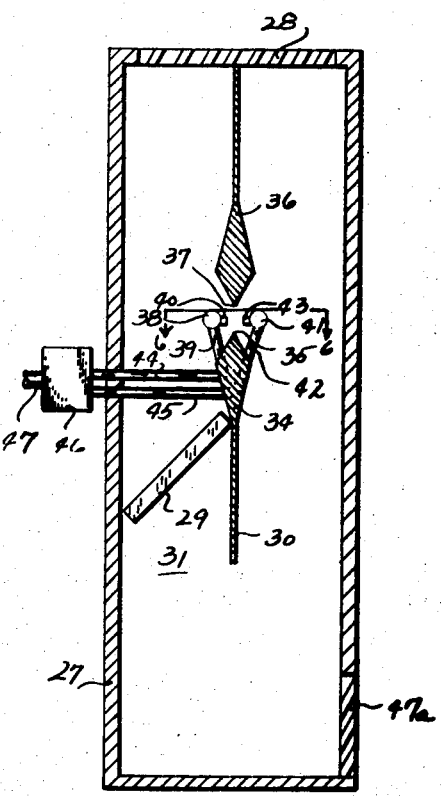
FIG. 5 is a simplified line view similar to FIG. 1 showing an alternative construction of the fluidic amplifying means and its location within a high velocity air induction unit.

Under certain conditions, it may be desirable to mount a fluidic amplifying device above the conditioning coil and bypass duct; for example, as shown in FIGS. 5 and 6.

Generally, the embodiment shown in FIGS. 5 and 6 is similar to that of FIG. 1, and includes an outer housing 27 having a top air discharge opening 28. A conditioning coil unit 29 is mounted between the one side wall and a centrally located partition 30, defining conditioning air duct 31 and a bypass air duct 32. Partition 30 terminates at the lower end generally centrally of the housing unit with the upper end extending upwardly to the air discharge opening 28. The coil unit 29 is mounted immediately adjacent the lower end of the partition 30, and the fluidic amplifier 33 is mounted within the partition immediately above the conditioning coil unit 29. The fluidic amplifier 33 is illustrated as a directly opposed summing impact modulator, in contrast to the angularly related construction shown in the previous embodiment, and is supported on a lower support wall 34 forming a part of the partition 30. Generally, the support wall 34 is a laterally enlarged diamond-shaped member having an upper V-shaped wall defining a central edge 35. A similar top divider wall 36 has a lower edge 37 in alignment with edge 35 and cooperating to define a dividing orifice or opening between the ducts.

The fluidic amplifying device 33 includes a longitudinally extended conduit 38 interconnected to the upper inclined surface of the support wall 34 by interconnecting supporting struts 39. The conduit 38 includes a plurality of longitudinally spaced nozzles 40 which project laterally and horizontally of the housing in alignment with the opening between edges 35 and 37. The nozzles 40 terminate short of the edges for purposes of establishing the horizontally directed primary air jets or streams. A similar conduit 41 is similarly interconnected by conduit supports or struts 42 to the support wall 34 to the opposite side of edge 35. The conduit 41 is aligned with the conduit 38 and includes a plurality of nozzles 43 in directly opposed relation to the nozzles 40. A pair of primary air flow input lines 44 and 45 are provided and connected respectively to the adjacent ends of the conduits 38 and 41. The lines 44 and 45 are connected, as in FIG. 1, to a suitable controller 46, which in turn is connected to a primary air supply 47.

In the embodiment of the invention shown in FIGS. 5 and 6, the primary air flow is divided by the controller 46, which in turn controls the impact position of the streams from nozzles 40 and 43 with respect to the opening or orifice defined by the opposed edges 35 and 37. This results in a direct proportioning of the primary flow between the duct 31 above coil 29 and the bypass duct 32. Further, the primary flow does not aspirate until after impact and directional flow into the respective ducts. The two streams then aspirate the secondary flow from the opening 47A in the lower end of housing 27. The positioning of the fluidic amplifier 33 above the coil unit 29 and with the proportioning prior to aspiration provides aspiration between the conditioning and bypass ducts in direct proportion to the primary air division with the total secondary flow remaining approximately constant. This is in contrast to the angular unit shown in the previous embodiments wherein the aspiration occurs adjacent and by he primary flow jets prior to impact. The latter proportions a near constant secondary flow between the conditioning and bypass duct also. The choice between the two will generally be dictated by the fluid dynamic effects due to the inductor configuration.

Thus the operation of the device illustrated in FIG. 5 generally follows the concepts previously described in that the fluidic amplifier 33 delivers an approximately constant total flow of primary air with the vectoring being proportional to the signaling of the controller 46.

Although all of the embodiments shown in FIGS. 1 through 6 include a plurality of individual three dimensional primary jets, a two dimensional flow system; for example, as shown in FIGS. 7 and 8, may be employed. The systems shown in FIGS. 7 and 8 include a pair of opposed primary stream forming conduit units 48 and 49, similar to those shown in FIGS. 5 and 6. In FIGS. 7 and 8, the nozzles 50, however, are formed as a continuous radial projection of the respective conduits, rather than the plurality of individual nozzles, as shown in the previous embodiments. Further, in FIGS. 7 and 8 a transverse deflection control is illustrated wherein a deflection control conduit 51 is mounted above and to the discharge side of the conduit unit 48, it could also be to the inlet side of the conduit unit with a depending continuous nozzle 52 extending the longitudinal length of the unit 48. A fluidic signal applied to the conduit 51 establishes a deflection control stream which will deflect the stream from nozzle 48 relative to the stream from nozzle 49 by varying the impact position and the consequent flow of primary air with respect to ducts 31 and 32, similar to the system of FIGS. 3 and 4.

The choice between the axisymmetric primary flow of FIGS. 1 through 6 or the two dimensional flow configuration of FIGS. 7 and 8 depends upon the desired interface and aspiration characteristic compounded with the manufacturing and assembly cost. Either system will generally provide the necessary vectoring and proportioning.

As previously noted, any proportional fluidic amplifier may be employed. In FIG. 9 in the embodiment of the invention, an inductance type fluidic amplifier 53 is illustrated. The inductance amplifier 53 is mounted within a central partition in housing 54 above a conditioning coil 54A. The housing includes a top air discharge opening and a bottom secondary opening. The amplifier 53 includes a primary air or tube conduit 55 connected to a suitable source of primary air. The conduit includes a top slit or discharge opening 56 extending longitudinally throughout the length of the conduit 55 and, therefore, the housing 54. A control conduit or tube 57 is secured in concentric relation about the air conduit 55, and includes a bottom opening 58 through which signalling secondary air passes. The signalling air flows about the inner tube or conduit 55 and through beam deflection phenomena, controls the discharge of the primary air flow through a top opening in conduit 55 which is aligned with the opening 56 and defined by a pair of outwardly extended flanges 59 and 59'. A dividing wall 60 of an inverted pointed construction is secured centrally aligned between the flanges 59 and 59' and, therefore, within the opening 56. The divider 60 thus defines a pair of adjacent nozzles 61 and 62 through which the primary air is selectively passed to establish and control the principal aspiration of the secondary air upwardly through the respective ducts and about the exterior of the conduit 57. A small damper or flap control plate 63 is interconnected as by a pivot pin connection 64 to the bottom of the conduit 55, and extends downwardly through the opening 58. The flapper or control plate 63 controls the opening to the opposite sides and thereby controls the relative signal flows about the opposite sides of conduit 55.

In operation, the primary air flow through the opening 56 divides equally between the nozzles 61 and 62. With the damper 63 depending in the vertical plane of the amplifier, the opening 58 to the respective passageways to the opposite side of the conduit 55 are equal and equal amounts of secondary signaling air flow to the opposite sides of the conduit 55 as a result of aspiration by the primary air stream flow to establish equal signals to the opposite sides of the primary air flow which is, therefore, not deflected with respect to nozzles 61 and 62. This results in correspondingly directed aspiration control primary air streams issued from nozzles 61 and 62 with a corresponding aspiration of secondary air through the respective ducts.

If the plate 63 is pivoted, for example, to the left as viewed in FIG. 9, the opening to the left side of the amplifier 53 is reduced and that to the right side is increased. As a result, a greater vacuum is created in the left side as a result of aspiration. Consequently, the signal to the left side of the primary air stream is less than that to the right side of such stream and the primary air stream is correspondingly deflected toward nozzle 61. The increased primary air flow through nozzle 61 establishes a greater aspiration of secondary air upwardly through the coil 54a. Similarly, the correspondingly reduced primary air flow through nozzle 62 establishes a smaller aspiration of secondary air upwardly through the bypass duct.

The positioning of the plate 63 to the opposite side of center reverses the aspiration within the control passages and thereby deflects the primary air flow from nozzle 61 toward nozzle 62. This results in reducing the aspiration of secondary air through the coil 54a and increasing the aspiration of secondary air through the bypass duct.

This type of amplifier is particularly suited to operation within a partition above the coil 54a as shown because the principal aspiration of secondary air, which is created by the streams emitted from nozzles 61 and 62, occurs after the vectoring of the primary air stream.

In FIG. 10, an embodiment of the invention is illustrated employing a beam deflection amplifier 65 mounted within a suitable housing 66 having a top air discharge opening 67. The amplifier 65 is suitably secured within the housing. The secondary air opening 68 is provided in the outer wall at the housing 66. The body of the amplifier includes a bottom primary air inlet 69 with a primary air nozzle 70 formed therein. A pair of opposed signal passageways or orifices 71 and 72 are provided to the opposite side of the primary air stream path immediately adjacent the discharge end of the nozzle 70. An interacting chamber 73 is provided to receive he primary stream, with the opposite wall thereof including a pair of outlet passages 74 and 75 defined by the V-shaped wall 76. In the beam deflector, the primary air flow stream is aligned with the dividing wall to produce equal output flow through the passageways 74 and 75 in the absence of any input signal. This results in a corresponding flow to the opposite sides of the amplifying unit with corresponding secondary air aspiration. Application of control signals to the passageways 71 and 72 result in a lateral displacement of the power stream with respect to the dividing wall 76, and in accordance with the relative differential pressures of the signals. This, in turn, results in a corresponding shifting of the control stream with respect to the divider for varying the relative outputs in the passageways 74 and 75. In this invention, the walls of the chamber 73 are shown curved outwardly from the signal nozzles in a generally convex configuration. This is important to eliminate the usual lock-on effect associated with the more conventional beam deflector fluidic amplifier.

The beam deflector amplifier 65 provides a body structure which tends to interfere with the secondary air flow and thus is similarly more suited to application in a structure mounted within the partition wall above a coil unit 75a. The primary air flow only interacts with the flow on two surfaces with the secondary flow on two outer surfaces, and thereby tends to reduce the total aspiration.

The inductance amplifier and the beam deflection amplifier are suited to the partition-mounted construction because they also provide desirable proportioning of the secondary flow as a result of controlling the relative primary flow prior to aspiration.

In all of the above illustrated embodiments of the invention, the primary flow is vectored either before or after aspiration of the secondary air flow to produce a highly improved modulating control in a conditioning air induction unit. Further, in the above illustrations, vectoring employed the varying of direction and relative flows. Vectoring of the stream as employed herein includes controlling the direction and/or magnitude of a flow vector which, in turn, is the product of the mass flow rate and velocity.

A direct velocity control, in accordance with the present invention, is shown, for example, in FIG. 11, where the induction unit housing 77 is provided with a top wall opening 78 and a bottom secondary wall opening 79. An injection nozzle 80 is mounted generally centrally of the housing 77 and interconnected to the output of a flow modulating fluidic amplifier, such as a vortex amplifier 81. The primary air supply is connected to the radial input 82 of the vortex amplifier 81. A fluidic control signal is applied to a tangential control input 83. The center discharge passageway or output 84 of the vortex amplifier is connected to the injector nozzle 80. The primary air flow through the vortex amplifier 81 is directly controlled by the tangential fluidic control stream to thereby control the primary air flow from the nozzle 80. This, in turn, provides a direct control of the velocity of the primary air stream and the aspiration of the secondary air. This system, of course, merely provides the conditioning inherent in combining of a lower temperature or other characteristic primary air with the secondary air. It does, however, possess the rapid response, reliability, and essentially low cost features associated with fluidic devices.

The present invention thus provides a highly improved induction flow unit, essentially eliminating all large moving parts and permitting reliable, relatively inexpensive construction. A very rapid response and low hysteresis of fluidic amplifying devices will reduce the amplitude of oscillations in a control system and permit establishing of higher gain settings and lower offset. The configuration of fluidic amplifiers can be readily adapted to various lengths and irregular shapes and, consequently, will permit wide versatility in the construction of induction units. The present invention thus provides a highly improved means for controlling the mixing of fluids, and in particular, the controlling of the output temperature of air in environmental control units.

We claim:

1. A fluidic fluid mixing control apparatus for intermixing fluid from a primary fluid source and a secondary fluid source, comprising a fluidic amplifier having power stream input means connected to a primary fluid supply and having a high velocity output stream coupled to a secondary fluid supply to aspirate a secondary flow, means to vector said high velocity output stream and establish a pair of separate combined primary and secondary air flows, control means connected to signal said fluidic amplifier to vary the primary flow characteristic and thereby vary the secondary flow characteristic and means to thermally condition a select one of said pair of combined air flows to thereby heat or cool the corresponding airflow.

2. The fluidic fluid mixing control apparatus of claim 1 wherein said fluidic amplifier establishes said pair of output streams coupled to the secondary fluid supply establishing a secondary flow substantially in excess of the primary flow, and said control means includes a fluidic signal stream coupled to actuate said fluidic amplifier and control the secondary flow.

3. The fluidic fluid mixing control apparatus of claim 2 wherein said apparatus includes a pair of passageway means and said fluidic amplifier establishes said pair of output streams between said secondary fluid supply and said passageway means to aspirate said secondary flow and said control means includes a fluidic signal stream coupled to actuate said fluidic amplifier and control the secondary flow.

4. The fluidic fluid mixing control apparatus of claim 1 wherein said apparatus includes a pair of adjacent secondary air passageways and said fluidic amplifier establishes an output stream in each of said passageways, and said control means proportionally varies the relative magnitude of said output streams and thereby correspondingly varies the relative magnitude of secondary air through said two passageways.

5. The fluidic fluid mixing control apparatus of claim 1 wherein said apparatus includes a pair of adjacent secondary air passageways divided by wall means and said fluidic amplifier is mounted within the wall means and establishes said pair of output streams aligned one with each passageway, and said control means proportionally varies the relative strength of said output streams and thereby correspondingly varies the relative aspiration of the secondary air within said two passageways.

6. The fluidic fluid mixing control apparatus of claim 1 wherein said apparatus includes a pair of adjacent secondary air passageways divided by wall means and said fluidic amplifier is mounted below the wall means and establishes a pair of output streams aligned one with each passageway, and said control means proportionally varies the relative strength of said output streams and thereby correspondingly varies the relative aspiration of the secondary air within said two passageways.

7. The fluidic fluid mixing control apparatus of claim 1 having a pair of adjacent parallel secondary air passageways, said fluidic amplifier including an impact modulator having a pair of opposed orifice means establishing a pair of impacting streams, said orifice means being coupled to said primary fluid supply and establishing a pair of impacting streams, the relative strengths of the impacting streams being controlled by said control means and the impacting position of said streams being thereby positioned laterally of said air passageways to control the relative air flow through said passageways.

8. The fluidic fluid mixing control apparatus of claim 1 having a pair of adjacent parallel secondary air passageways separated by a wall means and defining a conditioning passageway means and a non-conditioning passageway, said fluidic amplifier including an impact modulator mounted within the wall means and having a pair of diametrically opposed orifice means establishing a pair of impacting streams impacting in the plane of the wall means, said orifice means being coupled to said primary fluid supply and having the relative strengths of the impacting streams controlled by said control means, whereby the primary air flow is divided between said passageways in accordance with the relative strength of the two streams, said primary flow in said respective passageways aspirating secondary air.

9. The fluidic fluid mixing control apparatus of claim 1 having a pair of adjacent parallel secondary air passageways separated by a wall means, said fluidic amplifier being an impact modulator having a pair of angular related opposed nozzle means connected to the primary air supply, said nozzle means being directed in the direction of air flow through said passageways and establishing a combined stream directed toward said wall means and divided thereby, and said control means including a fluid signal stream forming means to proportionally deflect the one primary stream relative to said second primary stream to vary the position of the combined stream with respect to said wall means and, thereby control the aspiration of the secondary air in the respective secondary air passageways.

10. The fluidic fluid mixing control apparatus of claim 1 having a pair of adjacent parallel secondary air passageways, said fluidic amplifier being a beam deflection unit having a primary stream nozzle to one side of a chamber and connected to the primary air supply and a pair of output passageways to the opposite side of said chamber, said output passageways terminating one in each of said secondary air passageways, and said control means including a pair of fluid signal means connected to said signal orifice means to proportionally deflect the stream from said primary stream nozzle with respect to said pair of output passageways and thereby control the aspiration of the secondary air in the respective secondary air passageways.

11. The fluidic fluid mixing control apparatus of claim 10 wherein said beam deflection amplifier includes outwardly curved walls between said primary stream nozzle and said pair of output passageways to prevent wall lock-on.

12. The fluidic fluid mixing control apparatus of claim 1 wherein said fluidic amplifier includes a primary stream means to establish a primary fluid stream relative to a pair of output passageways, a pair of control passageways one to each side of said primary air stream, said control passageways having inlets coupled to said secondary fluid source, and said control means includes flow control means to inversely open and close said air inlets to control the aspiration of fluid through said control passageways and thereby the fluid signal applied to said primary fluid stream to thereby control the position thereof relative to said pair of output passageways.

13. The fluidic fluid mixing control apparatus of claim 12 wherein said primary stream means includes a tubular nozzle means, said passageways being formed by a conduit means mounted concentrically about said nozzle means and having said output passageway symmetrically aligned with the nozzle means and having an opening in the diametrically opposite portion to define the inlets to said control passageways, and said flow control means constituting a pivotally mounted plate depending through said opening.

14. The fluidic fluid mixing control apparatus of claim 1 wherein said fluidic amplifier includes a plurality of laterally distributed primary air stream nozzles and means to selectively control said nozzles to vary the output flow of the several nozzles.

15. A fluidic air mixing control apparatus for intermixing of two air streams, comprising a primary air source, a secondary air source, a fluidic modulating means having power stream input means connected to said primary air source and having a high velocity output stream coupled to said secondary air source to aspirate a secondary flow, said secondary flow being greater than said primary flow, and control means connected to signal said fluidic modulating means to vary the primary flow characteristic and thereby vary the secondary flow characteristic wherein said control means is a vortex amplifier having a vortex chamber with a radial input connected to the primary fluid supply, and a central axial output passageway terminating in an output nozzle in a secondary air passageway, said control means establishing a fluid control signal and coupled to apply a tangential signal to said vortex chamber to proportionally control the output flow and thereby the aspiration of the secondary flow in said secondary air passageway.

* * * * *

UNITED STATES PATENT OFFICE
CERTIFICATE OF CORRECTION

Patent No. 3,654,944                     Dated April 11, 1972

Inventor(s) Richard N. Laakaniemi, Otto R. Munch, Paul H. Sorenson

It is certified that error appears in the above-identified patent and that said Letters Patent are hereby corrected as shown below:

Column 4, Line 65, cancel "units" second occurrence and insert --- 23 ---;

Column 7, Line 31, cancel "he" and insert --- the ---.

Signed and sealed this 17th day of October 1972.

(SEAL)
Attest:

EDWARD M. FLETCHER, JR.
Attesting Officer

ROBERT GOTTSCHALK
Commissioner of Patents